July 31, 1923.

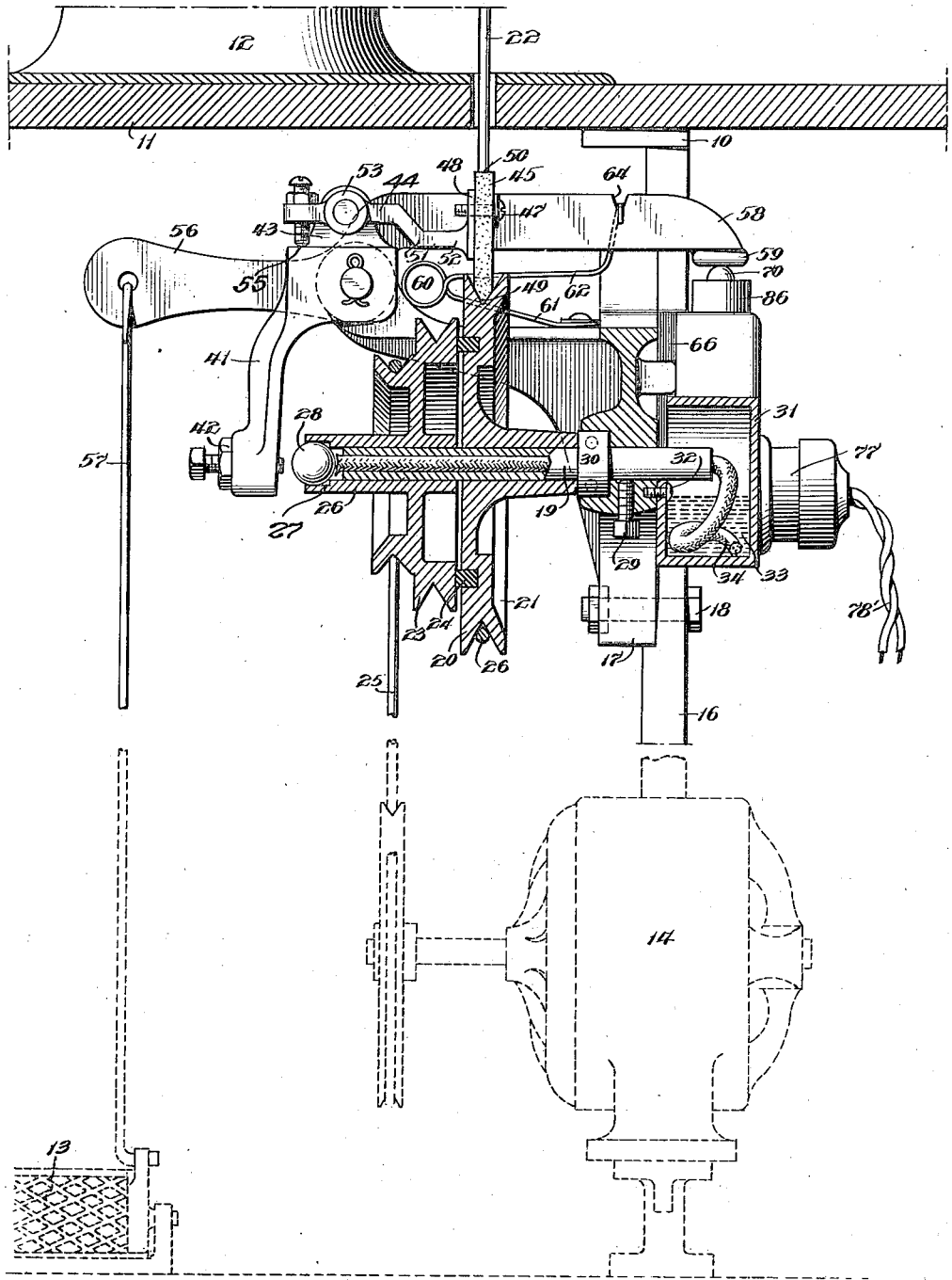

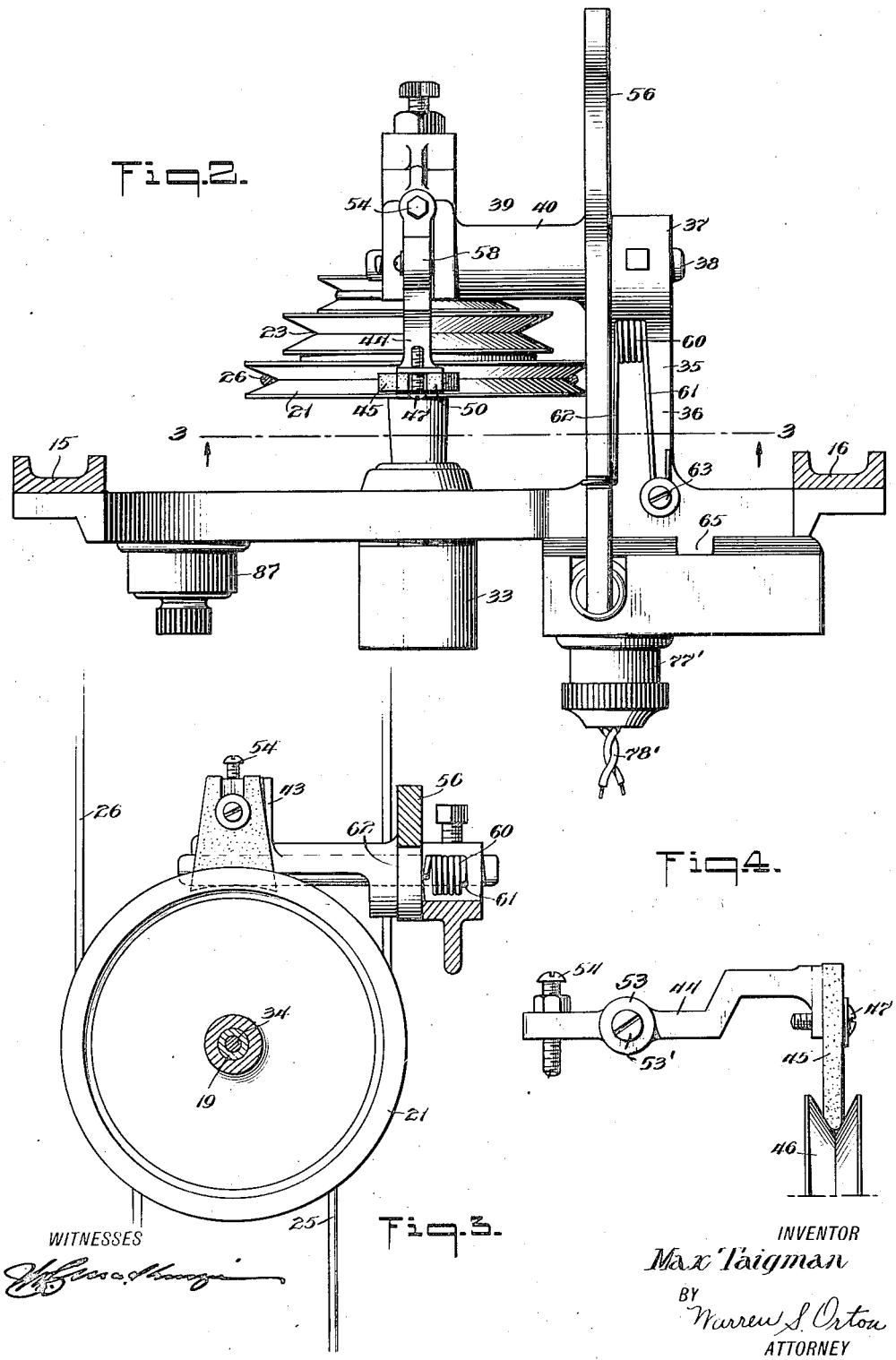

M. TAIGMAN

ELECTRICALLY CONTROLLED POWER TRANSMISSION

Original Filed June 7, 1921   3 Sheets-Sheet 3

1,463,449

WITNESSES

INVENTOR
Max Taigman
BY
Warren S. Orton
ATTORNEY

Patented July 31, 1923.

1,463,449

UNITED STATES PATENT OFFICE.

MAX TAIGMAN, OF NEW YORK, N. Y.

ELECTRICALLY-CONTROLLED POWER TRANSMISSION.

Application filed June 7, 1921, Serial No. 475,781. Renewed April 21, 1923.

*To all whom it may concern:*

Be it known that I, MAX TAIGMAN, a citizen of the United States, and resident of New York city, in the county of New York and State of New York, have invented certain new and useful Improvements in Electrically-Controlled Power Transmissions, of which the following is a specification.

The invention relates to a motor driven transmission and control for machines which are subjected to rapidly re-occurring intermissions in their operation and specifically relates to an attachment constituting a complete article of manufacture designed to be mounted on the frame of a motor driven sewing machine and designed to be disposed between the motor and the machine driven thereby.

In sewing machines of the factory type it is usual to actuate the machines at high speed, often attaining as much as three thousand stitches per minute. This high speed operation permits the operator to run along a seam for a few seconds, at the end of which run, and with the needle in locked position engaging the goods, the material is quickly shifted, often in a fraction of a second, after which the line of stitches is run in another direction. During this shift in direction it is desirous that the machine be positively inactive and with the needle stationary in locking position engaging the material, but it is not economy to have any more parts lose their momentum than is absolutely necessary.

Further this rapidly repeated starting and stopping places a severe strain upon the motor parts, necessitating the use of a braking device, which of course wears away rapidly, for it has to resist the torque of the moving parts which must be stopped in order to stop the needle.

Accordingly, one of the objects of the invention is to provide a simple form of motor actuated machine driving transmission in which frictional resistance is minimized, in which the current is quickly and positively shut off from the motor when not necessary for an active drive and in which the driven machine may be braked without the necessity of braking the massive revolving motor parts which revolve at high speed even when the current is shut off.

I attain this object in general by providing suitable anti-friction bearings and by providing a pulley clutch type of drive between the motor and the machine and a control therefor so organized that the motor and the driving element of the clutch are held by a brake and with the control so connected with a circuit closer controlling the motor that the single act of closing the circuit through the motor will simultaneously move the clutch elements into driving engagement and positively release the brake.

Still another object of the invention and further featuring simplicity of construction, low manufacturing cost and ready accessibility to the several parts, is to locate practically all of the motor control electrical features in a single ready removable and replaceable unit assembled in the bracket in such a way as will minimize fire and short-circuiting accidents.

Among the other objects of the invention are to provide a simple form of braking means which can be readily adjusted to fit different diametered pulleys to be braked; which will promptly stop the action of the relatively light driven parts of the machine when disconnected from the motor and incidental to these objects it is a further desideratum to provide a braking arrangement which will have no tendency to slow down the momentum of the unclutched motor.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Referring to the accompanying drawings:—

Figure 1 is a fragmentary view in front elevation of a motor driven sewing machine with a preferred embodiment of my invention attached thereto, shown largely in axial section and with the driving motor and pedal shown in ghost outline.

Figure 2 is a plan view of the attachment shown in Figure 1.

Figure 3 is a vertical sectional view taken approximately on the line 3—3 of Figure 2 looking in the direction indicated by the arrows;

Figure 4 is an enlarged detail view of the brake member modified from the similar showing in Fig. 1.

Figure 5:
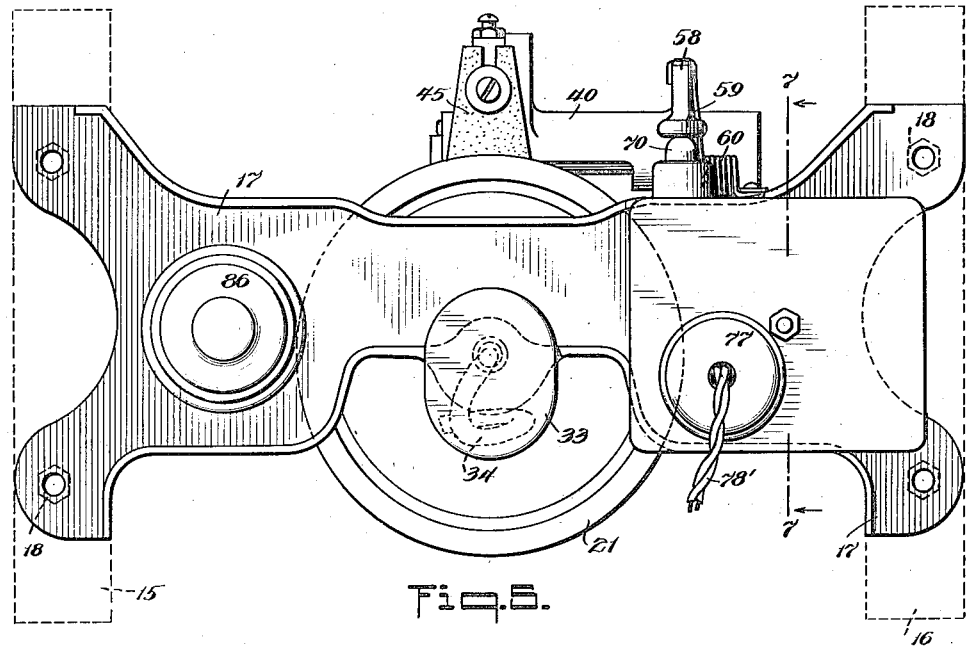
Figure 5 is a view in front elevation of the attachment looking upwardly from the bottom of the showing in Fig. 2.
Figure 6:
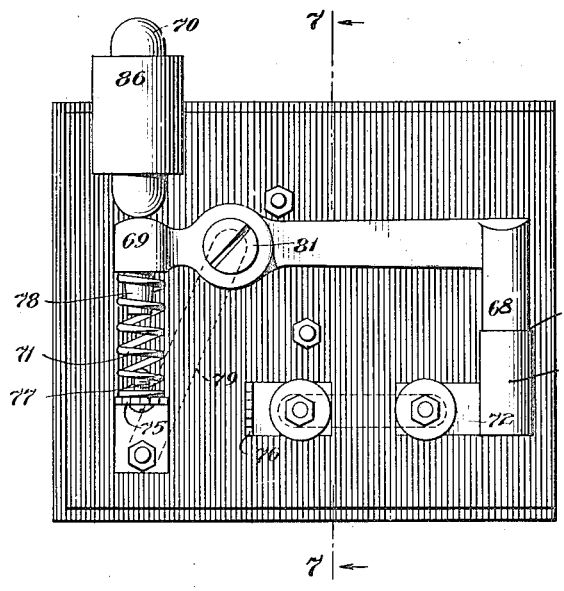
Figure 7:
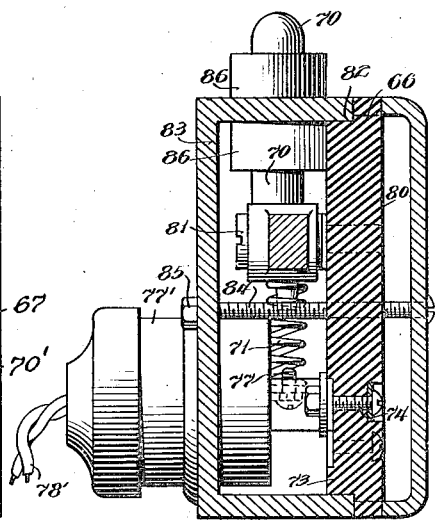

Figure 6 is an enlarged view in elevation of the molded insert plate within the casing at the right of Figures 2 and 5 and Figure 7 is a transverse sectional view taken on the line 7—7 of Figure 5 and along the line 7—7 of Figure 6.

In the following description and in the claims, parts will be identified by specific names for convenience of expression but they are intended to be as generic in their application to similar parts as the art will permit.

In the drawings there is shown a conventional form of motor driven sewing machine of the type which is driven by its own motive power and independent of the motive powers of contiguous similar machines. The machine illustrated is in general of conventional form and includes a supporting frame 10 upon the work table 11 of which is mounted a sewing machine head 12 and disposed beneath which is the control pedal 13. A motor 14 for driving the machine is suspended between the uprights 15 and 16 at one end of the support 10. One of the primary features of this invention is to provide a construction so organized that any type of motor 14 may be utilized with the driving and control connection hereinafter described. By this means it is possible not only to utilize a direct motor but it is also possible to use an alternating current motor with the resulting advantages inherent in the use of such a motor in place of the direct current motor hereinbefore necessary for use in connection with such devices which employ a rheostat type of controller box for making and breaking the current through the motor.

The invention particularly forming the subject-matter of this invention is in the form of an attachment 17 constituting a complete article of manufacture and in the form of a bracket fixed by means of bolts 18 to the uprights above the motor 14 and below the driving pulley (not shown) of the machine 12. The attachment includes a dead pulley supporting stub shaft 19 projecting through and demountably secured in the bracket 17 at the center thereof. A clutch 20 of the side-face friction type, is loosely mounted on the shaft on the inner side of the bracket as shown in Fig. 1. This clutch includes a driven pulley 21 in constant driving engagement with the machine pulley by means of a belt 22. The coacting driving element 23 of the clutch is in the form of a compound pulley slidably mounted on the shaft 19 for movement to and from the friction ring 24 carried in the adjacent face of the pulley 21. Either element of the compound pulley 23 is in constant driving connection with the motor 14 by means of a belt 25. The pulley 23 is provided with a hollow bearing extension 26 projecting beyond the end of the shaft 19 and provided at its outer end with a countersunk recess 27 containing a housed roller bearing 28.

The shaft 19 is demountably secured in the bracket by means of a set screw 29 and an end thrust bearing 30 is positioned on the shaft, fitted within a recess formed in the adjacent face of the bracket and disposed to take up end thrusts of the pulley 21 when the clutch is in operative engagement. The end of the shaft opposite the end carrying the clutch pulley projects forwardly through the bracket and terminates in a lubricant receptacle 31 demountably secured by means of screws 32 to the front, central side of the bracket as shown more particularly in Figure 5. The receptacle contains some suitable form of lubricant 33, and a lubricant conducting wick 34 is positioned within the hollow pulley shaft 19, with one end thereof in juxtaposition to the roller bearing 28 to supply the same with lubricant and with the other end disposed in the lubricant within the receptacle 31. By this means it is possible to supply lubricant to the roller bearing 28 and this lubricant will creep from left to right of the showing in Figure 1 between the shaft and the pulleys mounted thereon and will eventually reach the end thrust bearing 30 to lubricate the same.

Referring to the showing in Figure 2 it is noted that the bracket includes a rearwardly projecting integral extension 35 buttressed as shown in Figure 1 to form a supplemental bracket. The forward portion 36 of this bracket coacts with the main supporting bracket to provide a spring support for the spring hereinafter described. The rear portion of the supplemental bracket is upturned to form a shaft supporting boss 37. A supporting shaft 38 is mounted in a long bearing provided by the boss 37 and extends at right angles to and is spaced above the rear end of the shaft 19.

A manually actuated control member in the form of a one-piece casting 39 includes a centrally positioned hub 40 rotatably mounted on the portion of the shaft 38 which extends laterally from the bracket 35. The member 39 is provided at opposite ends of its hub portion 40 with a pair of arms which extend laterally from the axis of rotation of the member. One of the arms 41 (see Figures 1 and 2) is in the form of a bell crank lever which depends in advance of the roller bearing 28 and is provided with an adjustable set screw 42, which constitutes a shifter normally spaced from the bearing 28 and designed to engage the bearing to act therethrough and thus shift the pulley 23 into clutching engagement with the pulley 21. It is noted that the movement of the shifter is substantially in line with the axis of the shaft thus tending to minimize binding action between the shifted pulley and its shaft as the pulley is moved into its clutching relation with the coacting pulley. The second arm 43 extends upwardly from the arm 41 and constitutes a support and an actuating arm for a brake member 44 which overlaps the pulley 21 and is provided at its free end with a removable brake member 45 designed normally to bear in the groove of the pulley 21 to break the action thereof against the dead pulley shaft 19 and therethrough to break the action of the sewing machine 12.

It is intended that different diametered pulleys be substituted for the pulley 21 and one such different pulley is shown at 46 in Figure 4. To accommodate for small differences in diameters of the pulleys and to compensate for the wear on the member 45 this member is adjustable by means of a binding screw 47. However, with relatively great differences in diameters of the pulleys used, it is sometimes desired to make the brake member accommodate itself to greater ranges of adjustment than can be provided by the shifting of the brake member 44. For this purpose the brake member 44 is formed substantially T-shaped, with a broad head 48 for carrying the member 45. Opposite ends 49 and 50 of this pulley engaging member 45 are each to be adopted to provide the braking surface for engaging the pulley, and are preferably made of or outlined by a leather surface. The stem portion 51 of the T-shape member 44 is offset from the portion 52 engaging the head and this offset portion is provided with a hub 53 designed to engage a pivoting pin 53′ which projects from the arm 43 in a direction parallel to the axis of rotation of the member 39. A set screw 54 which may be reversed in position is threaded through the offset portion 44 and bears on a face 55 constituting part of the arm 43 so as to vary the position of the surface 49 or 50 relative to the pulley periphery designed to be engaged by the surface. It is appreciated that the set screw may be withdrawn and reversed in position, the member 44 reversed so as to cause the portion 52 to become further spaced from the pulley and thus cause the surface 50 to engage a larger sized pulley, as shown more particularly in Figure 4.

Another arm 56 projects rearwardly from the end of the hub 40 adjacent the extension 35 and constitutes an actuating lever for rocking the member 39 about the supporting shaft 38. The end of the lever 56 is connected to the pedal 13 by means of a link rod 57. Another arm 58 which constitutes, in effect, an extension of the arm 56 extends above and parallel to the extension 35, overlaps the bracket as shown in Figures 1 and 2 and is provided at its forward end with a head 59 designed to control a circuit closer hereinafter more fully described. A coiled spring 60 has long ends 61 and 62 which extend lengthwise of the extension, with one of the ends 61 secured to the top of the bracket by means of a screw 63 and its other end 62 bent and hooked into a notch 64 formed in the upper side of the lever 58 in spaced relation to the fulcrum of the member 39. It is appreciated that by means of this construction it is possible to utilize a relatively weak spring to actuate the circuit closer, to move the clutch shifter into an inoperative position and to exert a powerful leverage effect upon the brake.

The portion of the bracket in advance of the extension is provided at top and bottom with forwardly projecting lugs, one of which 65 is shown in Figure 2, and against this portion of the bracket is fitted a moulded plate 66 designed to carry the circuit closer and its associated electric current carrying parts. The circuit through the motor 14 is controlled by a normally opened switch 67 which includes a movable contact member 68 in the form of a lever held normally in circuit breaking position by the bearing engagement on one short arm 69 thereof, of a plunger 70 held in depressed position by the action of the spring 60 bearing on the arm 58 as more clearly shown in Figure 1. The movable element 68 is moved into circuit closing engagement, as shown in Figure 6, with a relatively fixed contact 71′ by its weight which action is assisted by a spring 71 engaging under the extension 69. It is a feature of this disclosure that the fixed parts of the circuit closer be formed in the plate 66 coeval with its formation and in the showing in Figures 6 and 7 it is to be understood that the relatively fixed contact member 71 is secured to a plate 72 inset into the front face of the plate 66, and, if necessary, secured in place by means of through bolts 74. Similarly the front face 73 is provided with circuit terminals 75 and 76 which are designed to be engaged by a removable plug 77′ of conventional form carrying the leads 78 constituting part of the motor circuit. In the showing disclosed the terminal 75 constitutes a support for one end of the spring 71 and an upwardly extending screw 77 from this terminal coacts with a stud 78 depending from the arm 69 to guide the spring.

While the spring 71 may constitute a conductor for the electric current leading to the movable element of the circuit closer, preferably the current is conducted through an insert strip 79 moulded in the rear side 80 of the plate 66 and leading from the terminal 75 to the rear side of the pivot pin 80 on which the lever 68 is mounted. Similarly an insert plate 81 on the rear side 80 of the plate 66 electrically connects the terminal 76 with the plate 72 through the agency of connecting screws 74.

The front face 73 of the plate 66 is provided with a marginal shouldered portion 82 against which is fitted a cover 83 held in place by through bolt 84 extending forwardly from the bracket, past holes formed in the plate 66. The bolts are threaded to receive holding nuts 85, bearing on the front face of the cover. The cover 83 is provided with a socket for receiving the plug 77 and is provided on its upper side with a guiding sleeve 86 for guiding the upwardly projecting plunger 70.

The supporting bracket may also be provided on the side opposite the circuit closer with a manually actuated switch 87 for controlling the motor circuit.

In operation and assuming that the clutch elements shown in Figure 1 are in the position illustrated and that the circuit closer shown in Figure 6 is in an inoperative position with the power circuit to the motor broken at the contacts and with the brake member holding the machine inactive, the operator bears down upon the pedal 13. The initial part of this action will raise the lever 58 a distance sufficient to permit the spring 71 to bring the movable contact member 68 into circuit closing engagement with the stationary contact 70' thus closing circuit through the motor 14 and causing the motor to pick up speed. At the same time the intense braking action of the member 44 against the pulley 21 begins to be reduced and as the operator continues to press down on the pedal 13 the brake is finally moved clear of the pulley at which time the arm 41 has swung its bearing screw 42 into engagement with the bearing 28 and has acted therethrough to move the clutch members into inter-clutching engagement. Power is thus transmitted through the belted connections 25 and 22 from the motor directly through the clutch to the driving pulley on the machine. During this time the movable contact member 68 is maintained in firm bearing engagement against the contact 70 by the spring 71 which thus prevents any jarring of the machine from braking the circuit.

The sewing machine is operated as is usual with such devices and when the operator desires to stop the machine suddenly he releases pressure on the pedal 13, which permits the relatively powerful spring 60 to snap the brake member into firm braking engagement with the pulley 21 thus stopping the machine almost instantaneously. This action will also automatically break the circuit through the motor but the motor and the pulley 23 connected thereto are free to spin around practically at the high speed at which these devices are usually actuated. Eventually the motor will die down to a stop but in the normal operation of the machine there will be no perceptible diminution of speed of the motor parts during the second or fraction thereof during which the operator is shifting the goods. When the operator again presses down upon the pedal 13 the machine starts up again practically at the high speed at which it was previously driven.

By means of a device of this character it is possible to brake the driven element 21 against the dead shaft 19, which braking action will have no effect, whatsoever, upon the freedom of rotary movement of the motor actuated pulley 23. The whole organization of the parts is primarily directed to a construction which will permit the positive braking of the sewing machine with the least possible braking action on the motor and its driven parts thereby effecting an economy in consumption of electric energy.

Having thus described my invention, I claim:—

1. An article of manufacture complete in itself and constituting the controlling connection between a downwardly extending motor driven belt and an upwardly extending machine driving belt, said article comprising a supporting bracket adapted to be secured to the frame of the machine to be driven, a combined two-pulley clutch with one of the pulleys adapted to receive the driven belt and the other pulley adapted to receive the driving belt and a brake for braking the movement of the pulley carrying the driven belt, said brake and clutch carried by the bracket and a single control also carried by the bracket and adapted to be connected to a pedal for actuating the clutch, brake and circuit closer in proper operative sequence, said article being removable from the machine as a unit after the belts are slipped off their pulleys.

2. An article of manufacture constituting the driving connection between a motor driven belt and a machine driving belt, said article including a supporting bracket provided with means for securing the same to a support, a circuit closer carried by the bracket, a clutch adapted when in operative position to transmit power from the driving to the driven belt and a manually actuated control carried by the bracket for simultaneously controlling the circuit closer and clutch.

3. An article of manufacture constituting the driven connection between a motor driven belt and a machine driving belt, said article comprising a bracket provided with attachments for demountably securing the same in place between the motor and the machine to be driven thereby, said bracket provided with means for transmitting power at will from the driven to the driving belt, with means for braking the machine and with means for controlling the motor and a single manually actuated mechanism for operating all of said means in proper relation to interrupt the operation of the motor and to brake the driven machine.

4. An article of manufacture constituting the driving connection between a motor driven belt and a machine driving belt, said article comprising a bracket provided with attachments for demountably securing the same in place between the motor and the machine to be driven thereby, said bracket provided with means for transmitting power at will from the driven to the driving belt, with means for braking the machine and with means for controlling the motor, a single manually actuated mechanism for operating all of said means in proper relation to interrupt the operations of the motor and to brake the driven machine and a switch carried by the bracket for controlling the electric circuit which includes the circuit closer.

5. In a device of the class described, the combination of a bracket provided with means for mounting the same in place, an extension projecting laterally from one side of the bracket, a control shaft carried by the extension, a circuit closer casing carried by the bracket on the side thereof opposite the extension, a circuit closer including a vertically movable plunger slidably mounted in the casing and projecting from the same, and a lever fulcrumed intermediate its ends on said shaft, with one arm extending across the bracket and bearing on said plunger to move the same and the other arm constituting an actuating lever.

6. In a device of the class described, the combination of a bracket provided with means for mounting the same in position and provided with a laterally extending spring supporting extension projecting rearwardly from the bracket, a circuit closer carried by the bracket on the side thereof opposite the extension, a lever pivoted to the extension with one arm projecting rearwardly from the extension and constituting an actuating lever and another arm paralleling the extension and operately connected to the circuit closer to control the same, and a coiled spring having end portions extending parallel to the extension with one end secured to the extension and the other end engaging the circuit closer controlling arm in spaced relation to the fulcrum of the lever whereby a relatively weak spring can exert a powerful leverage on the circuit closer controlling arm.

7. In a device of the class described, the combination of a bracket provided with means for mounting the same in position and provided with a laterally extending spring supporting extension projecting rearwardly from the bracket, a circuit closer carried by the bracket on the side thereof opposite the extension, a lever pivoted to the extension with one arm projecting rearwardly from the extension and constituting an actuating lever and another arm constituting a combined bracket and clutch control paralleling the extension and operately connected to the circuit closer to control the same and a coiled spring having end portions extending parallel to the extension with one end secured to the extension and the other end engaging the circuit closer controlling arm in spaced relation to the fulcrum of the lever whereby a relatively weak spring can exert a powerful leverage on the circuit closer controlling arm, and on the combined brake and clutch controlling arm.

8. In a device of the class described, the combination of a support, a fixed pulley shaft secured in and extending from said support, a pair of clutch pulleys each loose on said shaft, an end-thrust bearing between the support and the adjacent driven pulley and an anti-friction bearing defining the other end of the other or driving pulley and a shifter pivotally mounted on the support and having an adjusting screw movable axially of the shaft for engaging said anti-friction bearing and acting therethrough to move the driving pulley into clutching engagement with the driven pulley and for moving the driven pulley into bearing engagement with the end thrust bearing.

9. In a device of the class described, the combination of a support, a hollow pulley shaft mounted in said support, means for demountably securing the shaft in place, a pair of clutch pulleys both loose on the shaft, a roller bearing carried by one of the pulleys, a shifter for engaging said roller bearing and acting therethrough to effect a driving engagement between the pulleys and said hollow shaft providing a conduit for conducting a lubricant to the roller bearing.

10. In a device of the class described the combination of a support, a hollow pulley shaft mounted in said support. means for demountably securing the shaft in place, a pair of clutch pulleys both loose on the shaft, a roller bearing carried by one of the pulleys, a shifter for engaging said roller bearing and acting therethrough to effect a driving engagement between the pulleys and means for conducting a lubricant through the hollow shaft to said roller bearing.

11. In a device of the class described, the combination of a support, a lubricant receptacle mounted on one side of the support, a hollow shaft extending through the support with one end terminating in the receptacle and the other end projecting from the opposite side of the bracket, a pair of clutch pulleys carried by said projecting part of the shaft; a roller bearing carried by one of the pulleys adapted to be engaged by a shifter to move the pulleys into a driving relation and means for causing lubricant to travel from the reservoir through said shaft to the roller bearing.

12. In a device of the class described the combination of a support, a lubricant receptacle mounted on one side of the support, a hollow shaft extending through the support with one end terminating in the receptacle and the other end projecting from the opposite side of the bracket, a pair of clutch pulleys carried by said projecting part of the shaft; a roller bearing carried by one of the pulleys adapted to be engaged by a shifter to move the pulleys into a driving relation and a wick in said hollow shaft with one end in said receptacle and the other end adjacent the roller bearing.

13. In a device of the class described, the combination with a support, of a plate formed of insulating material and means for demountably securing the same to said support, a circuit closer including a metallic relatively fixed contact secured in said insulating plate, and a lever pivotally mounted in the plate and constituting the movabe element of the circuit closer, a spring acting on the movable contact and tending normally to maintain the contacts in closed position and socket terminals carried by the plate and connected electrically to the contacts whereby the removal of the plate will carry with it the circuit closer and its socket terminals.

14. In a device of the class described, the combination with a support, of a plate formed of insulating material and means for demountably securing the same to said support, a circuit closer including a metallic, relatively fixed, contact secured in said insulating plate, a lever pivotally mounted in the plate and constituting the movable element of the circuit closer, a spring acting on the movable contact and tending normally to maintain the contacts in closed position, socket terminals carried by the plate and connected electrically to the contacts and a plunger mounted for sliding movement and adapted to bear on the lever to move the same into circuit breaking position against the tension of said spring.

15. In a device of the class described, the combination with a support, of a plate formed of insulating material, means for demountably securing the same to said support, a circuit closer including a metallic, relatively fixed, contact secured in said insulating plate and a lever pivotally mounted in the plate and constituting the movable element of the circuit closer, a spring acting on the movable contact and tending normally to maintain the contacts in closed position, socket terminals carried by the plate and connected electrically to the contacts, a plunger mounted for sliding movement and adapted to bear, on the lever to move the same into circuit breaking position against the tension of said spring, a manually actuated lever adapted normally to bear, on said plunger and to act therethrough to move the circuit closer into open position, and a spring having a greater tension than the first named spring acting on the lever to move the same into operative position.

16. In a device of the class described, the combination of a bracket, an insulating plate carried by said bracket and provided with a circuit closer including a relatively fixed element and a lever constituting a relatively movable element, a cover coacting with the plate to form a circuit closer containing casing, said cover provided with a plunger guiding sleeve, a plunger slidably mounted in said sleeve with one end projecting exteriorly of the casing and the other end bearing on the lever and tending when moved by force external of the casing to move the lever into circuit opening position.

17. In a device of the class described, the combination of a bracket, an insulating plate carried by said bracket and provided with a circuit closer including a relatively fixed element and a lever constituting a relatively movable element, a cover coacting with the plate to form a circuit closer containing casing, said cover provided with a plunger guiding sleeve, a plunger slidably mounted in said sleeve with one end projecting exteriorly of the casing and the other end bearing on the lever and tending when moved by force external of the casing to move the lever into circuit spring position, and means for engaging the externally projecting portion of the plunger thereby to control the circuit closer.

18. In a device of the class described, the combination of a molded plate formed of insulating material and including a plurality of inserts on one side thereof, said inserts including a fixed contact, a lever pivot and a pair of socket terminals, with one connected electrically to the fixed contact and the other similarly connected to the lever pivot, all of said inserts being secured in position coeval with the formation of the plate.

19. In a device of the class described, the combination of a molded plate formed of insulating material and including a plurality of inserts on one side thereof, said inserts including a fixed contact, a lever pivot and a pair of socket terminals, with one connected electrically to the fixed contact and the other similarly connected to the lever pivot, all of said inserts being secured in position coeval with the formation of the plate, a lever pivotally connected to said lever pivot and constituting a movable contact coacting with the fixed contact to form a circuit closer.

20. In a device of the class described, the combination of a molded plate formed of insulating material and including a plurality of inserts on one side thereof, said inserts including a fixed contact, a lever pivot and a pair of socket terminals, with one connected electrically to the fixed contact and the other similarly connected to the lever pivot, all of said inserts being secured in position coeval with the formation of the plate, a lever pivotally connected to said lever pivot and constituting a movable contact coacting with the fixed contact to form a circuit closer, and a spring disposed between one of the terminals and one arm of the lever.

21. In a device of the class described, the combination of a molded plate having a fixed contact and two inserted socket terminals formed coeval therewith, a lever pivoted to the plate and coacting with the fixed contact to form a circuit closer, and a spring between one of the terminals and the lever to maintain the same in bearing engagement with the fixed contact.

22. In a device of the class described, the combination of a molded plate having a fixed contact and two inserted socket terminals formed coeval therewith, a lever pivoted to the plate and coacting with the fixed contact to form a circuit closer, and a spring between one of the terminals and the lever to maintain the same in bearing engagement with the fixed contact, said plate formed with apertures passing therethrough and adapted to receive fastening means for mounting the plate in position.

23. In a device of the class described, the combination with a support of a molded plate having a fixed contact and two inserted socket terminals formed coeval therewith, a lever pivoted to the plate and coacting with the fixed contact to form a circuit closer, a spring between one of the terminals and the lever to maintain the same in bearing engagement with the fixed contact and bolts passing through the plate and support for securing the plate in place.

24. In a device of the class described, the combination of a molded plate of insulating material, a plurality of inserts in one face thereof, two of said inserts constituting socket terminals, and another of said inserts constituting a fixed terminal of a circuit closer, a lever constituting the movable element of the circuit closer mounted on said face, a plurality of inserts on the opposite face of the plate constituting electric conductors and through bolts coacting therewith to electrically connect one of the terminals with the fixed contact, and the other terminal with the lever.

25. In a device of the class described, the combination of a molded plate of insulating materials, a plurality of inserts in one face thereof, two of said inserts constituting socket terminals, and another of said inserts constituting a fixed terminal of a circuit closer, a lever constituting the movable element of the circuit closer mounted on said face, a plurality of inserts on the opposite face of the plate constituting electric conductors, through bolts coacting therewith to electrically connect one of the terminals with the fixed contact, and the other terminal with the lever, said lever and one of the terminals provided with aligned spring guiding studs and a spring encircling said studs and bearing on the lever to move the same into bearing engagement with the fixed contact.

26. In a device of the class described, the combination of a molded plate of insulating material, a plurality of inserts in one face thereof, two of said inserts constituting socket terminals, and another of said inserts constituting a fixed terminal of a circuit closer, a lever constituting the movable element of the circuit closer mounted on said face, a plurality of inserts on the opposite face of the plate constituting electric conductors, through bolts coacting therewith to electrically connect one of the terminals with the fixed contact, and the other terminal with the lever, an electric socket adapted to be fitted to said terminals and a cover for the molded plate provided with an aperture for guiding the socket into place.

27. In a device of the class described, the combination of a pulley shaft, adapted to receive pulleys of different radii, a pulley mounted on said shaft, a manually actuated control member pivotally mounted for rocking movement about a fixed axis, a brake carried by the member and adapted to engage the periphery of the pulley to brake the same as said member is actuated, means for adjusting the brake relative to said member to cause the same to fit the pulleys of different radii, and other means for adjusting the brake to compensate for wear.

28. In a device of the class described, the combination of a pulley shaft adapted to receive pulleys of different radii, a pulley mounted on said shaft, a manually actuated control member pivotally mounted for rocking movement about a fixed axis, a brake carried by the member and adapted to engage the periphery of the pulley to brake the same as said member is actuated, said brake having two operable faces and being reversible to cause either face to engage with the pulley.

29. In a device of the class described, the combination of a pulley shaft adapted to receive pulleys of different radii, a pulley mounted on said shaft, a manually actuated control member pivotally mounted for rocking movement about a fixed axis, a brake carried by the member and adapted to engage the periphery of the pulley to brake the same as said member is actuated, said brake having two operable faces and being reversible to cause either face to engage with the pulley, and means for adjusting either face relative to the pulley to be braked.

30. In a device of the class described, the combination with a pulley clutch, a pivotally mounted and manually actuated member having a lever arm for engaging the clutch to move the same axially into operative position and having another lever arm constituting a brake support, and a brake pivotally mounted on said brake support for engaging the periphery of one of the pulleys forming the clutch and a set screw for adjusting the brake relative to the support and thus relative to the pulley engaged by the brake.

31. In a device of the class described, the combination with a pulley clutch, a pivotally mounted and manually actuated member having a lever arm for engaging the clutch to move the same axially into operative position and having another lever arm constituting a brake support, a brake pivotally mounted on said brake support for engaging the periphery of one of the pulleys forming the clutch, a set screw for adjusting the brake relative to the support and thus relative to the pulley engaged by the brake and a spring acting on the manually actuated member for moving the brake into engagement with the pulley.

32. In a device of the class described, the combination of a pulley, a manually actuated control member mounted for rocking movement about an axis offset from the pulley, a brake member having a plurality of operative work faces for engaging the periphery of the pulley and means for mounting the brake member on the control member and in offset relation to its axis to set any desired work face of the brake in position to engage the pulley when the control member is rocked.

33. In a device of the class described, the combination with a shaft adapted to receive pulleys of different diameters, a pulley mounted on said shaft, a control member mounted for rocking movement about an axis at right angles to said shaft, a brake supporting shaft carried by the member parallel to its axis, a brake member having oppositely disposed work faces adapted to be mounted on said brake supporting shaft to bring either work face into opposition to the pulley.

34. In a device of the class described, the combination with a shaft adapted to receive pulleys of different diameters, a pulley mounted on said shaft, a control member mounted for rocking movement about an axis at right angles to said shaft, a brake supporting shaft carried by the member parallel to its axis, a brake member having oppositely disposed work faces adapted to be mounted on said brake supporting shaft to bring either work face into opposition to the pulley and adjusting means for varying the engagement of either work face with the pulley.

35. In a device of the class described, the combination of a member mounted for rotary movement, a manually actuated control member mounted for rocking movement, a T-shaped brake member with opposite ends of the head thereof constituting work forces each adapted to engage the rotary member to brake the same and means for mounting the stem of the brake member on the control member.

36. In a device of the class described, the combination of a member mounted for rotary movement, a manually actuated control member mounted for rocking movement, a T-shaped brake member with opposite ends of the head thereof constituting work forces each adapted to engage the rotary member to brake the same, means for pivotally mounting the stem of the brake member on the control member and a set screw for adjusting the brake member relative to the control member.

37. In a device of the class described, the combination with a member to be braked, of a control member mounted for rocking movement about an axis and having a pivoting stud paralleling said axis, a T-shaped brake member with opposite ends of the head thereof each constituting a braking surface for engaging the member to be braked, the stem of said T shaped member being offset from a line perpendicular to the center of the head and said offset portion provided with a hub for engaging the stud.

38. In a device of the class described, the combination with a member to be braked, of a control member mounted for rocking movement about an axis and having a pivoting stud paralleling said axis, a T-shaped brake member with opposite ends of the head thereof each constituting a braking surface for engaging the member to be braked, the stem of said T-shaped member being offset from a line perpendicular to the center of the head and said offset portion provided with a hub for engaging the stud and means for setting the T-shaped member in adjusted rotary position about said stud.

39. In a device of the class described, the combination of a pulley clutch, a single manually actuated control member mounted for rocking movement and including a lever arm for controlling the clutch and a periphery engaging brake member for braking one of the pulleys of the clutch when the clutch is in non-clutching position, said brake member provided with a plurality of brake surfaces and means for mounting the brake member on the control member to bring any one of said surfaces at will into operative relation to the pulley to be braked.

40. In a device of the class described, the combination with a member to be braked, a control member and a brake member having oppositely disposed brake surfaces and means for mounting the brake member on the control member in reversible position to bring either surface into engaegment with the member to be braked.

Signed at New York city, in the county of New York and State of New York this 2nd day of June, A. D. 1921.

MAX TAIGMAN.